United States Patent [19]
Moffat

[11] Patent Number: 4,588,162
[45] Date of Patent: May 13, 1986

[54] SOLENOID VALVE

[75] Inventor: Allen J. Moffat, Wilmington, Ohio

[73] Assignee: Airmatic-Allied, Inc., Wilmington, Ohio

[21] Appl. No.: 620,507

[22] Filed: Jun. 14, 1984

[51] Int. Cl.⁴ ............................................. F16K 31/06
[52] U.S. Cl. ............................. 251/129.16; 137/625.65
[58] Field of Search ..................... 251/141, 129, 129.16, 251/129.15; 137/625.65, 625.64

[56] References Cited
U.S. PATENT DOCUMENTS

| 2,914,034 | 11/1959 | Becker | 251/141 X |
| 3,100,103 | 8/1963 | Bullard | 251/141 X |
| 3,586,287 | 6/1971 | Knobel | 251/141 X |
| 3,926,405 | 12/1975 | Arnold | 251/141 X |
| 3,972,505 | 8/1976 | Padula | 137/625.65 X |
| 4,463,969 | 8/1984 | Harrison | 251/141 X |

Primary Examiner—Arnold Rosenthal
Attorney, Agent, or Firm—Woodling, Krost & Rust

[57] ABSTRACT

An improved valve disc solenoid operated valve is disclosed. The valve has a simplified three major pieces construction with solenoid bypass fluid passages.

14 Claims, 4 Drawing Figures

SOLENOID VALVE

This invention relates to an improved free actuating disc solenoid operated valve.

It is an object of this invention to simplify the construction of free disc valves.

It is an object of this invention to increase the flexibility of free disc valves.

It is an object of this invention to increase the actuation forces of free disc valves.

It is an object of this invention to improve the repairability of free disc valves.

It is an object of this invention to reduce the cost of free disc valves.

Other advantages of the invention will be apparent from the drawings in which.

DESCRIPTION

Figure 1:
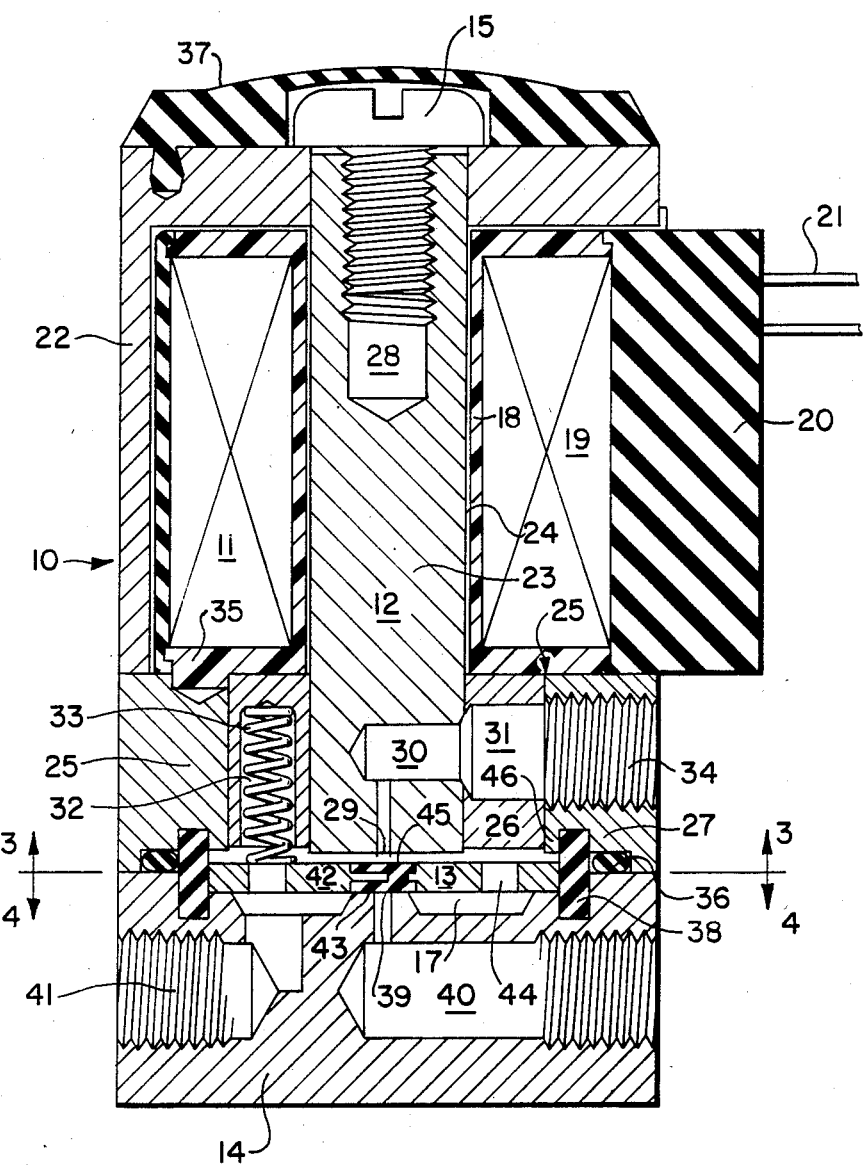
FIG. 1 is a cutaway side view of an electrically operated free actuating disc valve incorporating the invention of this application.
Figure 2:
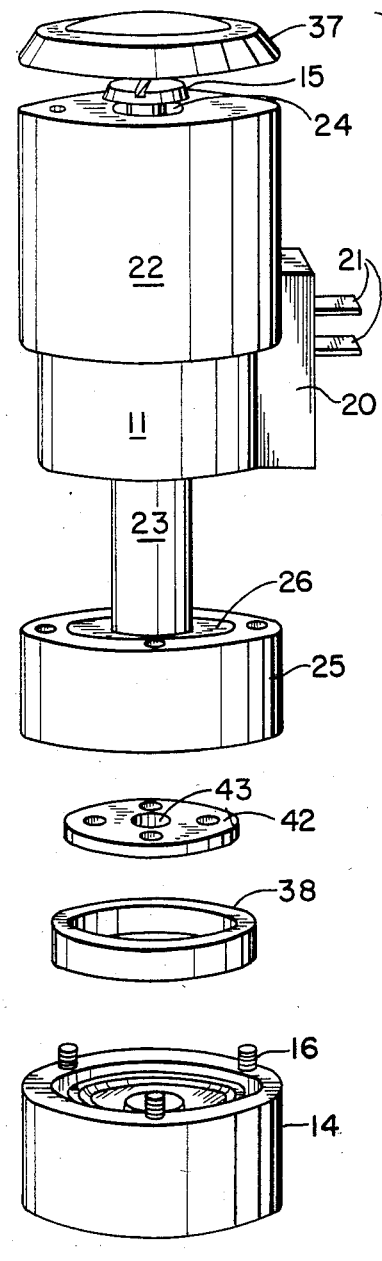
FIG. 2 is an expanded unassembled perspective view of the electrically operated free disc valve of FIG. 1.

The improved free actuating disc solenoid operated valve 10 of this invention includes a coil assembly 11, an upper body-pole piece section 12, a plunger disc 13 and a lower body section 14. The coil assembly 11 is attached to the upper body-pole piece section 12 through an enlarged head pan head screw 15. The lower body section 14 is connected to the upper body-pole piece section 12 through bolts 16. The plunger disc 13 is loosely captured in a cavity 17 between the upper body-pole piece section 12 and the lower body section 14.

The coil assembly 11 includes an armature 18, coil windings 19, a full wave rectifier 20 (optional—used for AC voltages), spade electrical connections 21 and a housing 22. The coil assembly 11 is constructed by winding the coil windings 19 about the bobbin 18, connecting the rectifier 20 and the spade electrical connections 21 to the coil windings 19, and then potting the entire assembly with polyester. This molded unit is then inserted into a mild steel housing 22. When this operation is complete, the coil assembly 11 looks and acts as a single unitary piece member. The housing 22 provides a path to conduct magnetic flux from the center pole to the upper body 25. The housing 22-molded unit serves as an environmental protector for the electrical parts contained therein, protecting these parts from physical shock, moisture contamination, corrosion, et al. The housing 22 also acts as a heatsink to dissipate the heat generated by the coil windings 19.

The coil assembly 11 is designed to be positioned about the pole piece 23 of the upper body-pole piece section 12. For this reason the diameter of the hole 24 through the coil assembly 11 is slightly larger than the diameter of the pole piece 23. The length of the pole piece 23 is a little less than the length of the coil assembly 11. In the construction/repair of the valve 10 the coil assembly 11 is located on the pole piece 23 of the upper body-pole piece section 12, positioned in the desired rotational position in respect to the upper body-pole piece section 12, and then fastened to such upper body-pole piece section 12 by the enlarged head pan head screw 15. The tightening of the screw 15 captures the coil assembly between the screw 15 and the upper surface 25 of the upper body 12. A snap on cover/name plate 37 covers and protects the screw 15. Due to the ability to rotate the coil assembly 11 about the pole piece 23 (at least until screw 15 is tightened), one is not limited to any particular rotational relationship between the coil assembly 11 and the rest of the valve 10: one can locate the coil assembly as desired. This increases the flexibility (and utility/repairability) of the device. It is preferred that the coil assembly have a small projection 35 on its lower side. This projection engages one of a series of holes in the top 25 of the upper body section 12 to prevent the rotation of the coil assembly 11 in respect to the upper body-pole piece section 12 after finished assembly. The series of holes in the surface 25 upper body section 12 extend circumferentially about such section. There are normally at least four such holes 90° apart. Due to this spacing one is not locked into any particular rotational orientation between the coil assembly 11 and the upper body-pole piece section 12.

Figure 3:
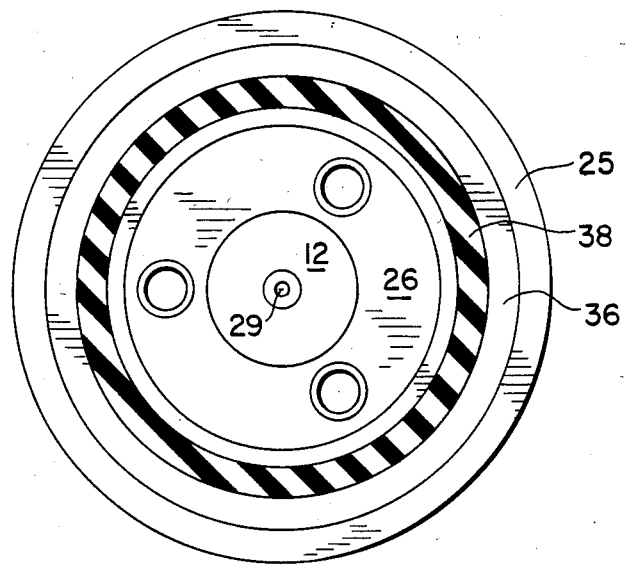
FIG. 3 is a cutaway end view of the electrically operated free disc valve of FIG. 1 taken generally along lines 3—3 of that figure.
Figure 4:
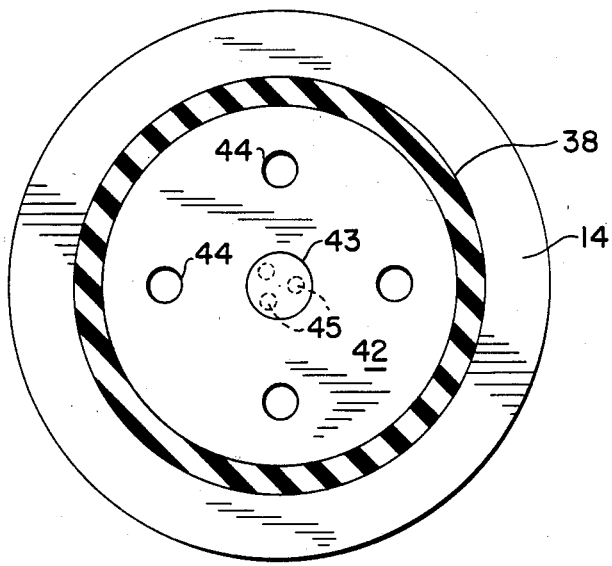
FIG. 4 is a cutaway end view of the electrically operated free disc valve of FIG. 1 taken generally along lines 4—4 of that figure.

The upper body-pole piece section 12 includes a magnetic pole piece 23, a non-magnetic connecting ring 26 and a magnetic outer ring 27. All parts are of corrosion resistant materials. The magnetic pole piece 23 is formed in a generally cylindrical shape. A threaded bore 28 for screw 15 is formed in one end of the pole piece 23. A valve opening 29 and associated fluid passage 30 is formed in the other end of the pole piece 23. An integral slightly raised valve sealing lip surrounds the valve opening. The non-magnetic connecting ring 26 is formed in a generally ring shape. The connecting ring 26 is preferably coated with copper plating to facilitate the brazing operation to be later described. The inner opening in the ring 26 is sized to surround the pole piece 23 (tight fit preferred). A radial fluid passageway 31 formed in the connecting ring 26 connects with the fluid passage 30 in the pole piece 23. Three axial cavities 32 (see FIGS. 1 and 3) are designed to contain valve disc biasing springs 33 (the springs 33 to be later described). The connecting ring 26 surrounds the lower part of the pole piece 23. The magnetic outer ring 27 is formed in a generally ring shape. The inner opening in the outer ring 27 is sized to surround the connecting ring 26 (tight fit preferred). A radial fluid port 34 is formed in the outer ring 27. This port 34 serves to connect the valve opening 29 to the outside world. The pole piece 23, non-magnetic connecting ring 26 and magnetic outer ring 27 are brazed together by passing the assembly through a brazing oven to form the generally inverted "T" shaped unitary upper body-pole piece section 12. There is a copper bond between the pieces of the assembly.

The upper body-pole piece section 12 is connected to the lower body section 14 by bolts 16. An O-ring seal 36 prevents leakage between the upper body-pole piece section 12 and the lower body section 14. All port connections are located in these body sections 12,14. This feature permits access to the coil section without disturbing the piping connections. (In the prior art one port normally extended through the coil. The coil could not be removed/repaired without a complete disassembly of the valve.) This feature of our new valve also allows the valves to be located next to each other with direct interconnection of their ports. (In the prior art the ports normally extended axially of the device.) The upper body-pole piece section 12 and the lower body section 14 define a plunger disc cavity 17 therebetween. A non-magnetic, preferably plastic, guide ring 38 defines the outer perimeter of the plunger disc cavity 17.

The lower body section 14 is a single unitary part. This section is made up of a non-magnetic corrosion resistant material. The actual material is not critical. A molded thermoplastic can be used. The lower body section 14 has one valve opening 39 and two fluid ports 40,41. One fluid port 40 communicates with the valve opening 39. The other fluid port 41 communicates with the plunger disc cavity 17. An integral slightly raised valve sealing lip surrounds the valve opening 39.

The plunger disc 13 includes a magnetic body section 42, an internal molded valve seal 43 and through passage holes 44. The plunger disc 13 is of magnetic corrosion resistant material. The valve seal 43 is of an elastometric material. The sealing surfaces of the seal 43 are substantially flush with the respective surfaces of the plunger disc 13. Three small through holes 45 join the upper part of the valve seal 43 with the lower part of the valve seal 43. These holes insure that the valve seal 43 will not shift axially or rotationally in respect to the plunger disc 13. The valve seal 43 is molded in place. The through passage holes 44 allow fluid to pass through the magnetic body section 42 of the plunger disc 13 between the various fluid ports 34,40,41.

The plunger disc 43 is trapped within the plunger disc cavity 17 between the upper body-pole piece section 12 and the lower body section 14. The outer diameter of the plunger disc 13 is a little less than the inner diameter of the plunger guide ring 38. For this reason the plunger guide ring 38 locates the plunger disc 13 within the cavity 17. The guide ring 38 also prevents the binding (physical or magnetic) of the plunger disc 13 during the actuation. Due to the through passage holes 44 in the body section 42 of the plunger disc 13, the space between the plunger disc 13 and the plunger guide ring 38 can be small without producing fluid bypass induced vibration or forces. The springs 33 in the axial cavities 32 of the connecting ring 26 bias the plunger disc 13 to seal the valve opening 39. Due to the multiplicity of the springs 33 this biasing force is balanced about the plunger disc 13. The size and strength of the springs 33 are chosen to accommodate the chosen size of the valve opening orifices and the desired operating pressures. The springs 33 are of a corrosion resistant material, normally steel.

In unergized condition the biasing forces of the springs 33 cause the plunger disc 13 to close the valve opening 39. The fluid flows between fluid port 34 and 41 through the through holes 44 in the plunger disc 13 and the valve opening 29.

To actuate the solenoid operated valve 10, one connects the electrical connections 21 to a power source. The coil assembly 19 of the solenoid operated valve 11 has been previously selected to match this power source re: voltage (AC or DC), amperage, etc. The connection of the valve 10 to a power source energizes the coil 19. One pole 45 of the resultant electromagnet is the lower end of the pole piece 23 (at the valve opening 29). The other pole 46 of the resultant electromagnet is the lower side of the magnetic outer ring 27 which forms part of the upper body-pole piece section 12. (The housing 22 has conducted this magnetism from the top end of the pole piece 23 (at the screw 15) to the top side of the magnetic outer ring 27. If necessary, a small amount of a ferro-fluid in the gap between the pole piece 23 and the housing 22 and between the housing 22 and the outer ring 27 will strengthen this transfer.)) The non-magnetic inner ring 26 physically separates one pole 45 from the other pole 46. The energization of the electromagnet causes the plunger disc 13 to move upwards towards the pole pieces 45,46 against the biasing pressure of springs 33. The non-magnetic plunger guide ring 38 prevents the radial shifting and/or binding of the plunger disc 13. The plunger disc 13 eventually moves to a position closing the valve opening 29. The plunger disc 13 becomes a short between the pole pieces 45,46 at this time. This means that the valve opening 29 is closed by a high force with a small expenditure of electrical energy. The fluid now flows between fluid port 41 and fluid port 40 through valve opening 39.

Upon cessation of electricity to the coil 19 of the solenoid valve 10, the pressure of the springs 33 returns the plunger disc 13 to its previous unactuated condition with the valve opening 29 closed.

The coil assembly 11 is mounted upon the rest of the valve 10 by a single screw 15. The removal and replacement of the coil assembly 11 does not involve, or compromise the integrity of, the fluidic passages of the valve 10 in any way. Due to these factors, the inventory requirements of a supplier are greatly reduced with a vast increase in the utility of the supplied valves. For example, with ten differing voltage amperage coil assemblies 11 and ten differing valve opening/fluid port configuration valve bodies, the supplier has one hundred different valves that he can supply.

The coil assembly 11 is totally separate from the fluidic passages in the valve 10; the upper body section separates the electrical and fluidic areas. The coil assembly 11 can be worked upon, removed and/or replaced without in any way affecting the integrity of the fluidic passages. It is not necessary to compromise the fluidic passages in any way when working on the coil. For this reason, one can radically alter the operating voltages/parameters of already installed valves, for example boosting operating voltage from 6 to 24 volts, with a quick plug-in type exchange of coils. The fluid part of the system would in no way be affected. One can also quickly fix a malfunctioning coil without a major teardown of the associated machine. The utility/serviceability of the valve is thus dramatically increased.

Although this invention has been described with some certainty, it is recognized that numerous changes can be made without deviating from the invention as hereinafter claimed.

What is claimed is:

1. An improved solenoid operated valve comprising a magnetic pole piece, said pole piece having two ends, a valve opening, said valve opening being in one end of said pole piece, said valve opening opening into a fluid area of the valve, first fluid port means forming a fluid connection for said fluid area, a non-magnetic connecting ring, said connecting ring surrounding at least part of said one end of said pole piece, means to connect said connecting ring to said pole piece, a magnetic outer ring, said outer ring surrounding at least part of said connecting ring, means to connect said outer ring to said connecting ring, a magnetic housing, said housing magnetically connecting the other end of said pole piece to said outer ring, means to connect said housing to said pole piece, a fluid passage, a second fluid port, said second fluid port being in said outer ring, said fluid passage extending radially of said pole piece to connect said valve opening to said second fluid port, an electrical solenoid coil, said coil surrounding said pole piece between the two ends thereof, said coil being in an electrical area of the valve, valve means, said valve means being movable to a position closing said valve opening, the energization of said coil operating said valve means and closing said valve opening and preventing the flow of fluid between said first and second fluid ports, and said pole piece, said connecting ring and said outer ring combining to totally separate said electrical area of the valve from said fluid area of the valve and allow said coil to be removable so as to provide for said coils removal and/or installation without any effect on the integrity of the fluid area of the valve.

2. The improved solenoid valve of claim 1 characterized in that said housing is removable to allow access to said coil.

3. An improved solenoid operated valve comprising a magnetic pole piece, said pole piece having two ends, a valve opening, said valve opening being in one end of said pole piece, said valve opening opening into a fluid area of the valve, first fluid port means forming a fluid connection for said area, a magnetic plunger disc, said plunger disc being in said fluid area, said plunger disc selectively movable to a position closing said valve opening, a non-magnetic connecting ring, said connecting ring surrounding at least part of said one end of said pole piece, means to connect said connecting ring to said pole piece, a magnetic outer ring, said outer ring surrounding at least part of said connecting ring, means to connect said outer ring to said connecting ring, a magnetic housing, said housing magnetically connecting the other end of said pole piece to said outer ring, means to connect said housing to said pole piece, a fluid passage, a second fluid port, said second fluid port being in said outer ring, said fluid passage extending radially of said pole piece through said pole piece, said connecting ring and said outer ring to connect said valve opening to said second fluid port, an electrical solenoid coil, said coil surrounding said pole piece between the two ends thereof, said coil being in an electrical area of the valve, the energization of said coil causing said plunger disc to move towards said pole piece and said outer ring to a position closing said valve opening and preventing the flow of fluid between said first and second fluid ports, and said pole piece, said connecting ring and said outer ring combining to totally separate said electrical area of the valve from said fluid area of the valve and allow said coil to be removable so as to provide for said coils removal and/or installation without any effect on the integrity of the fluid area of the valve.

4. The improved solenoid valve of claim 3 characterized in that said housing is removable to allow access to said coil.

5. The improved solenoid valve of claim 3 characterized by the addition of a non-magnetic plunger guide ring, and said plunger guide ring surrounding said plunger disc, said plunger guide ring ameliorating the radial magnetic forces on said disc.

6. An improved solenoid operated valve comprising a magnetic pole piece, said pole piece having two ends, a valve opening, said valve opening being in one end of said pole piece, a non-magnetic connecting ring, said connecting ring surrounding at least part of said one end of said pole piece, means to connect said connecting ring to said pole piece, a magnetic outer ring, said outer ring surrounding at least part of said connecting ring, means to connect said outer ring to said connecting ring, a magnetic housing, means to removably connect said housing to the other end of said pole piece and/or said outer ring, said housing magnetically connecting the other end of said pole piece to said outer ring, a first fluid port, a fluid passage, a second fluid port, said second fluid port being in said outer ring, said fluid passage extending radially of said pole piece through said pole piece, said connecting ring and said outer ring to connect said valve opening with said second fluid port, an electrical solenoid coil, said coil surrounding said pole piece between the two ends thereof, said coil being removable from said pole piece after the removal of said housing from the valve, said pole piece, said connecting ring and said outer ring combining to define an upper body section, a lower body section, means to connect said lower body section to said upper body section, said upper body section and said lower body section cooperating to define a fluid area of the valve, said upper body section separating said coil from said fluid area of the valve, said first port forming a fluid connection for said fluid area, said valve opening opening into said fluid area, a magnetic plunger disc, said plunger disc being in said fluid area, said plunger disc selectively axially movable to a position closing said valve opening, a non-magnetic plunger guide ring, said plunger guide ring surrounding said plunger disc, said plunger guide ring ameliorating the radial magnetic forces on said plunger disc, and the energization of said coil causing said plunger disc to move axially towards said pole piece and said outer ring to a position closing said valve opening and preventing the flow of fluid between said first and second fluid ports.

7. The solenoid valve of claim 8 characterized in that there is a valve cavity adjacent to the valve opening, a plunger disc contained within such valve cavity, the plunger disc selectively movable in one direction within the confines of walls of a valve cavity to close a valve opening, a separate plunger guide ring, said separate plunger guide ring being non-magnetic, and said separate plunger guide ring surrounding said plunger disc defining the wall of the cavity to prevent movement of the plunger disc in directions other than the desired operative direction.

8. An improvement for a solenoid valve having an axially extending magnetic pole piece with a valve opening in one end thereof, a coil surrounding the pole piece, a magnetic outer ring connected to the pole piece by means of a non-magnetic connecting ring, a magnetic housing magnetically connecting the other end of the pole piece to the outer ring and a fluid port for the valve opening, the improvement comprising the non-magnetic connecting ring radially surrounding the one end of the magnetic pole piece, the magnetic outer ring radially surrounding the non-magnetic connecting ring, the fluid port being located in the magnetic outer ring and the addition of a fluid passage extending through the non-magnetic connecting ring joining the valve opening to the fluid port.

9. The improved solenoid valve of claim 8 wherein the magnetic outer ring has a top surface directed to the other end of the pole piece and characterized in that the magnetic housing abuts said top surface in magnetically connecting the other end of the pole piece to the outer ring.

10. The improved solenoid valve of claim 8 wherein the solenoid valve has a plunger disc and characterized by the addition of a spring means, said spring means extending between the non-magnetic connecting ring and said plunger disc to bias said plunger disc away from the valve opening.

11. The improved solenoid valve of claim 10 characterized in that said spring means comprises two or more springs, and by the addition of holes with bottoms, said holes being in the non-magnetic connecting ring and said two or more springs being located in said holes extending between said bottoms of said holes and said plunger disc to bias said plunger disc away from the valve opening.

12. The improved solenoid valve of claim 8 wherein the solenoid valve has a plunger disc, said plunger disc moving axially of the solenoid valve in a cavity in the housing of the solenoid to close the valve opening, and characterized by the addition of a separate guide ring, and said separate guide ring being located in the housing of the solenoid surrounding the cavity in the solenoid.

13. The improved solenoid valve of claim 7 wherein said separate plunger guide ring closely surrounds the plunger disc and the plunger disc has fluid passage holes therein.

14. The improved solenoid valve of claim 7 wherein the cavity in the solenoid has substantially a non-magnetic metal radially outward surface and wherein said separate plunger guide ring is let into the non-magnetic metal to replace such non-magnetic metal as the radially outward surface of the cavity.

* * * * *